United States Patent Office 2,879,595
Patented Mar. 31, 1959

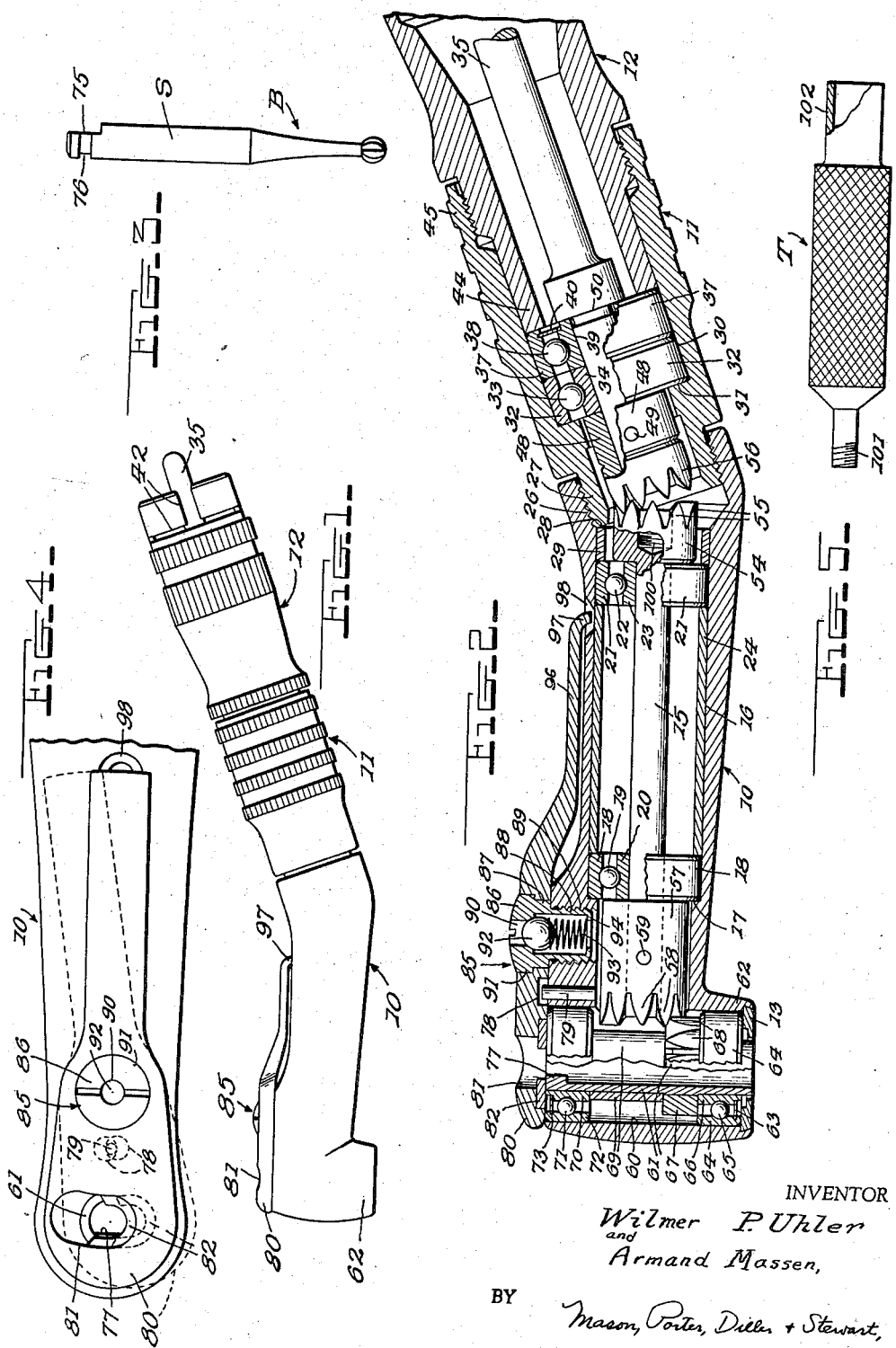

2,879,595
BALL BEARING CONTRA-ANGLE HANDPIECE

Wilmer P. Uhler, Tottenville, and Armand Massen, Staten Island, N.Y., assignors to The S. S. White Dental Manufacturing Company, Philadelphia, Pa., a corporation of Pennsylvania Application January 25, 1956, Serial No. 561,222

11 Claims. (Cl. 32—27)

This invention relates to handpieces which are useful for holding and effecting rotation of cutting tools such as dental burs for example.

An object of the invention is the provision of a handpiece comprised of separable parts formed as sub-assemblies so that they may be separated, cleaned and reassembled without requirement of great skill and expensive equipment.

Another object is the provision of a handpiece of contra-angle type, in which the rotatable tool is turned about an axis at an acute angle to the general extension of the tool, and comprised of separable outer parts effective to protect and contain internal parts including sub-assemblies which are brought to and held in predetermined working relationship by the association of the external parts.

A further object is the provision of a handpiece having separable external parts effective to protect and contain internal parts including antifriction bearings, said bearings being incorporated in sub-assemblies to facilitate the operations of separation for inspection, cleaning and repair, and of re-assembly.

With these and other objects in view, as will appear from the following description and drawings of an illustrative form of practice, an embodiment of the invention is shown in the accompanying drawings, in which:

Fig. 1 is an elevation of a contra-angle handpiece according to the invention;

Fig. 2 is an axial section through the same;

Fig. 3 is an elevation of a dental bur employable with the handpiece;

Fig. 4 is an elevation of a part of the handpiece, showing a tool securing device;

Fig. 5 is an elevation of a tool employable in assembling and dis-assembling the handpiece.

In these drawings, a handpiece according to this invention is shown as having the outer handpiece 10, the tailpiece 11 and the tail sleeve 12, together with a nosepiece 13. The headpiece 10 has an axial bore for receiving the headpiece drive shaft 15. This bore has a larger internal portion 16 terminating near its front in a shoulder 17 against which bears the outer race 18 of a first antifriction bearing assembly including the balls 19 and the inner race 20 which is a tight accurate fit on the headpiece drive shaft 15. A second antifriction bearing assembly comprised of outer race 21, balls 22 and the inner race 23 is spaced rearward from the first antifriction assembly and held in such relation by a spacer sleeve 24 engaged with the outer races 18, 21. At the rear end of the headpiece 10 is provided an opening directed at an angle to the axis of the headpiece drive shaft 15, illustratively about 20 degrees, this opening having the internal threads 26 for receiving the externally threaded reduced portion 27 of the tailpiece 11. The end surface 28 of the reduced portion 27 engages a pressure sleeve 29 and forces the same against the outer race 21 of the rear antifriction bearing. The pressure sleeve 29 may be integral with the outer race 21.

The tailpiece 11 has an internal bore 30 of large diameter, terminating at its front end in a shoulder 31 against which bears the outer race 32 of an antifriction bearing including balls 33 and the inner race 34 which is a tight accurate fit on the tail drive shaft 35. Within the bore 30 is also fitted the outer race 37 of an antifriction bearing having balls 38 and an inner race 39 which abuts against the shoulder 50 of the tail drive shaft 35. The races 34, 39 abut one another, and are secured in place against shifting along the tail shaft by the gear body 48 which abuts against the inner race 34. The gear body 48 is held in position on the tail drive shaft 35 by a transverse pin 49, and fits loosely within the reduced bore of the tailpiece 11. It is preferred to employ a shield 40 in the antifriction bearing assembly 37, 38, 39. The outer race 37 bears against the outer race 32; and these outer races are clamped in position in the bore 30 by the engagement of the end of the threaded reduced portion 44 of the tail sleeve 12, with this portion 44 tightened within the threaded extension 45 of the tailpiece 11. The rear end of the tail sleeve 12 is conventionalized as having the semi-peripheral and axial slots 42, by which it is adapted for receiving the nose end of a sheath for a conventional type of dental driving shaft connected in driving relation to the rear end of the tail shaft 35; such parts are known and are not specifically claimed herein.

It will be understood that each of the antifriction bearing assemblies shown in the illustrative form are resistant in known manner to both axial and radial forces.

The headpiece drive shaft 15 has an enlarged head 54 at its rear end, provided with teeth 55 for engaging the teeth 56 formed on the tailpiece gear head 48. At the front end of the headpiece drive shaft, it is provided with a gear head 57, having teeth 58 on the front end thereof, and held against movement on the shaft 15 by a transverse pin 59. The front end of the headpiece has a transverse bore 60 for receiving the chuck sleeve 61 which projects through an aperture in the nosepiece 13, this nosepiece being supported by a shoulder in the projection 62 of the headpiece 10 and secured by closing the material of the projection 62 inward upon the beveled edge of the nosepiece as by spinning or peening. The outer race 64 of an antifriction bearing is closely fitted within the bore 60, below the gear head 57 and thus adjacent to the lower end of the chuck sleeve 61. This antifriction bearing includes the balls 65 and the inner race 66, the latter being an accurately tight fit upon the outside diameter at the lower end of the chuck sleeve 61. A shield 63 is provided at the axially outer end of this antifriction assembly. The chuck sleeve 61 has a chuck gear body 67 which in the illustrative form is closely fitted and brazed thereon: the chuck gear body 67 has the gear teeth 68 engaged with the teeth 58 of the head piece drive shaft gear body 57. The chuck gear body 67 abuts the upper end of the inner race 66. A spacer sleeve 69 abuts the upper surface of the chuck gear body 67 and supports the inner race 70 of an antifriction bearing for locating the bearing. This antifriction bearing includes the inner race 70 which is an accurately tight fit on the outside diameter of the chuck sleeve 61, the balls 71, a shield 73 at the outer or upper face, and an outer race 72 closely fitted within the bore 60.

The chuck sleeve 61 is intended to closely receive the shank S of a bur B (Fig. 3) having a flat 75 and a peripheral groove 76. The chuck sleeve 61 has an inward projection 77 for engaging the flat 75 and thus assuring the positive rotation of the bur.

A swing slide 80 is provided for clutching the bur against axial movement. This slide 80 has an aperture 81 which can be alined with the bore in the clutch sleeve 61, and is provided with a wear ring 82 which is brazed in place and has its internal periphery smaller than the bur shank to engage in the groove 76 of the bur shank S (Fig. 3); a part of the ring 82 being cut away so that it can be swung from the full line position (Fig. 4) in which it will engage in the groove 76 to detain the bur, into the dotted line position in which it will be free of the bur shank. The movement of the swing slide is limited to the motion necessary for engagement and disengagement of the bur by a stop pin 79 which is press-fitted into a hole in the headpiece 10 and which protrudes into a larger blind bore 78 in the lower face of the swing slide 80. When the swing slide 80 is moved to the maximum, as indicated by the dotted line position in Fig. 4, the bur can freely be removed from or be inserted into the chuck sleeve 61.

The swing slide performs the pivotal movement about a pivot screw 85 having an enlarged head portion 86 for detaining the swing slide, and having a shoulder at the lower end of its spacer portion 87 which is seated against the upper surface of the headpiece 10. The threaded stem 88 of the screw 85 is engaged in the threaded aperture 89 in the headpiece 10.

In the illustrative form, the slide pivot provided by a screw 85 is also used as a lubrication point. For this purpose, the screw 85 has a central aperture 90 within the upper flange 91, which can be sealed by the ball 92 pressed upwardly and outwardly by the spring 93 located below the ball and within the aperture 90 and reacting against the spun flange 94 at the lower end of the screw.

The rear or tail end 96 of the swing slide 80 has an inwardly turned end 97 for engaging in a notch 98 formed in the upper surface of the headpiece 10, for preventing accidental swinging of the swing slide 80.

With the contra-angle handpiece assembled in driving relation on the end of a dental handpiece, the tail shaft 35 is rotated under the dentist's control and transmits its rotation by teeth 56 to the teeth 55 and thus drives the headpiece drive shaft 15 which, in turn, by its teeth 58 acting on teeth 68, causes rotation of the chuck sleeve 61 and therewith rotates the bur supported in the chuck sleeve 61. The tail shaft 35 is supported by antifriction bearings 32, 33, 34, and 37, 38, 39 so that it turns smoothly and accurately and is held against axial movement, wherewith the engagement of teeth 55, 56 is accurately controlled. Similarly, the headpiece drive shaft 15 is carried by the antifriction bearings 18, 19, 20 and 21, 22, 23, which in turn are clamped within the headpiece so that the shaft 15 turns smoothly and accurately without endwise motion, so that the engagement of the teeth 58, 68 can be accurately pre-set. The chuck sleeve 61 is likewise supported by antifriction bearings 64, 65, 66, and 70, 71, 72 which are closely fitted within the bore 60 and upon the exterior of the chuck sleeve 61, and the inner races 66, 70 abut against spacer 69 and chuck gear body 67 so that endwise and lateral movement of the chuck sleeve 61 is limited, and therewith looseness in motion of the bur B is avoided, since the upper bearing can abut against the swing slide 80 and the lower bearing is held against the nosepiece 13.

The structure can be easily separated and the parts disassembled. When the tail sleeve 12 is unscrewed, the assembly of the tail drive shaft 35 with its gear body 48 and its antifriction bearings can be pulled out of the tailpiece 11. When the tailpiece 11 is unscrewed from the headpiece 10, it releases the spacer sleeve 29, and the headpiece drive shaft 15 with its bearings can be removed by engaging a threaded pulling stem, e.g. the part 101 of the special tool T, Fig. 5, with the internal threads 100 in the drive shaft head 54. The chuck sleeve assembly can be removed by unscrewing the pivot screw 85 and removing the swing slide 80, and then pushing upward with an inserted bur until the chuck sleeve assembly, with its antifriction bearings, is withdrawn from the bore 60.

It will be noted that the assemblies of bearings with their respective drive shafts are not separated during such removal.

The various parts can be reassembled by inverse operations, noting that each of the sub-assemblies for the tail shaft, the headpiece drive shaft and the chuck sleeve can be removed and replaced independently of one another before the final assembly, and that the final assembly assures their proper location and operation. In final assembly, the chuck sleeve sub-assembly is first pushed in place. The headpiece drive shaft sub-assembly is then introduced, and the end part 102 of the special tool T, Fig. 5, can be employed to press this sub-assembly into proper position with rotation of the sub-assembly or of the chuck sleeve to attain meshing of the gear teeth if needed. The spacer 29 is introduced; and the pre-assembled parts of the tailpiece are aligned and the tailpiece 11 is screwed into position, with relative rotation of the shafts if necessary to assure gear meshing.

When assembled, the threaded joint between the head and tail pieces is essentially lubricant tight, and escape of lubricant is prevented by the illustrative sealing pieces 40, 63, 73 provided in the outer antifriction bearings 37, 38, 39 and 64, 65, 66 and 70, 71, 72: so that lubricant introduced through the swing slide pivot 85 past the sealing ball valve 92 can move to all of the bearing points, but is restricted against escape either downward toward the cutting end of the bur or upward toward its shank: and likewise against escaping toward the flexible driving shaft.

It will be understood that the described form and practice are illustrative, and that the invention may be practiced in many ways within the scope of the appended claims.

What is claimed is:

1. A handpiece for a rotatable tool comprising a body portion having bores therethrough at angles to one another, a chuck sleeve in a first said bore, spaced first antifriction bearings between said sleeve and the wall of said first bore, a first gear fixedly connected with said sleeve between the said bearings, a drive shaft located in a second said bore, axially spaced second anti-friction bearings between said drive shaft and the wall of said other bore, a second gear fixedly connected with said drive shaft and in mesh with said first gear, the said second bearings having inner and outer races, said second bore having a portion adjacent said sleeve for receiving said second gear and also having a shoulder remote from said sleeve and a larger bore portion extending from said shoulder, one said outer race being engaged with said shoulder and the corresponding inner race being engaged with said second gear, spacer means in the second bore and extending between the outer races for maintaining the spacing thereof and means engaged with the body and bearing against the other said outer race and thereby acting through the said spacer means for holding said one outer race engaged with said shoulder and effective through the antifriction bearing which includes said one outer race for determining the meshing engagement of the said second and first gears.

2. A handpiece for a rotatable tool comprising a body portion having bores therethrough at angles to one another, a chuck sleeve in a first said bore, spaced first antifriction bearings between said sleeve and the wall of said first bore, the body portion having at one end of the said first bore an inwardly extending part for engaging the said first bearing, a movable part secured to the outside of the said body portion and movable across the other end of the said first bore, said movable part being cooperative with the said first bearings and chuck sleeve for preventing axial escape thereof, means for limiting the movement of said movable part, a first gear fixedly connected with said sleeve between the said bearings, a drive shaft located in another said bore, axially spaced second anti-friction bearings between said drive shaft and the wall of said other bore, a second gear fixedly connected with said drive shaft and in mesh with said first gear, the said second bearings having outer races, said second bore having a shoulder for engagement by one said outer race, spacer means in the second bore and extending between the outer races for maintaining the spacing thereof, and means acting through the said spacing means for holding said one outer race engaged with said shoulder.

3. A handpiece as in claim 2, in which the movable part includes a wear ring secured thereto and overlying the chuck sleeve when the movable part is in operative position.

4. A handpiece as in claim 2, for use with a rotatable tool having a peripheral groove, said tool extending through the chuck sleeve and presenting the groove within the movable part, in which the movable part has an aperture with an inward projection for engaging the walls of said groove in the operative position of the movable part whereby the tool is held against removal, said aperture having an enlarged portion which is free of the groove in a releasing position of the movable part whereby the tool can be removed.

5. A handpiece as in claim 2, in which the movable part is a pivoted member, and a pivot for said member is provided as a screw engaged in said body portion, said screw having a passage therethrough by which lubricant may be supplied into said other bore.

6. A handpiece as in claim 5, in which the means for limiting movement includes a pin on said body portion, and said pivoted member has a blind hole for receiving the pin, the walls of said blind hole providing stop means to limit the pivotal movement.

7. A handpiece for a rotatable tool comprising a body portion having bores therethrough at angles to one another, a chuck sleeve in a first said bore, spaced first anti-friction bearings between said sleeve and the wall of said first bore, a first gear fixedly connected with said sleeve between the said bearings, a drive shaft located in another said bore, axially spaced second anti-friction bearings between said drive shaft and the wall of said other bore, a second gear fixedly connected with said drive shaft and in mesh with said first gear, the said second bearings having outer races, said second bore having a shoulder for engagement by one said outer race, spacer means in the second bore and extending between the outer races for maintaining the spacing thereof, said drive shaft having an enlarged end remote from the chuck sleeve, said enlarged end being engaged with an inner race of said second bearings, said second gear being engaged with an inner race of a said second bearing, whereby the drive shaft, bearings and spacer means provide a sub-assembly, and means acting through the said spacing means for holding said one outer race engaged with said shoulder.

8. A handpiece for a rotatable tool comprising a body head portion having a bore therein with a shoulder, a head shaft in said bore and having enlarged ends, spaced anti-friction bearings between the shaft and the wall of the bore and including inner and outer races held against relative axial movement, the outer race of a forward ball bearing being engaged with the shoulder, spacer means between the outer races, inner races of said bearings being engaged with the said enlarged ends; a hollow tail portion, a tail shaft journalled for rotation in the tail portion; said shafts having interengaged coupling parts, said head portion having an internal thread at its rear, said tail portion having an external thread at its front, said threads being interengaged in the assembled structure, said tail portion having a part effective upon assembly to hold the said bearings against axial shifting.

9. A handpiece as in claim 8, in which the shaft has a threaded hole at its rear end, adapted for receiving a threaded stem whereby the sub-assembly of head shaft, bearings and spacer may be withdrawn from the said bore.

10. A handpiece for a rotatable tool comprising a body head portion having a bore therein, a head shaft in said bore, and bearing means between the shaft and the bore wall; a tail portion comprised of a hollow front tail piece and a rear tail sleeve, said tail piece having an internal shoulder between a larger rear bore portion and a smaller front bore portion, a tail shaft in said tail portion, tail bearing means between said tail shaft and the wall of the enlarged bore portion and engaged with said shoulder, said tail shaft having collars engaging the ends of the tail bearing means for preventing relative axial movement; said tail piece being threadedly engaged in the rear of the head portion, and said tail sleeve being threadedly engaged in the tail piece and having a part for maintaining said tail bearing means against the tail piece shoulder.

11. A handpiece for a rotatable tool comprising a body head portion having bores at angles to one another, a hollow tail piece threadedly engaged in the rear of a first head portion bore, and a tail sleeve threadedly engaged in the rear of the tail piece; a chuck sub-assembly comprising a chuck sleeve in another head portion bore, spaced first anti-friction bearings between the chuck sleeve and the wall of said other bore, spacer means between the first bearings, said other bore having inwardly projecting means at one end for limiting axial movement of the chuck sleeve and bearings, removable means at the other end of the said other bore for limiting such axial movement in the other direction, said chuck sleeve having gear teeth between said bearings; a head sub-assembly comprising second anti-friction bearings and spacer means therebetween, a head shaft rotatable in the bearings and having fixed collars engaging said bearings for limiting relative axial movements and having gear teeth at its ends, the teeth at the front end being in mesh with the chuck sleeve teeth, said first bore having a shoulder, said tail sleeve being effective upon assembly to hold the head sub-assembly in position with said first anti-friction bearing engaged with said shoulder; and a tail sub-assembly comprising third anti-friction bearing means, a tail shaft rotatable in said third bearing means and having fixed collars for engaging the same and limiting relative axial movement and having teeth at the front end engaged with the teeth at the rear end of the head shaft, said tail piece having an internal shoulder, said tail sleeve being effective in assembly for engaging said third bearing means and holding the same against said tail piece shoulder.

References Cited in the file of this patent

UNITED STATES PATENTS

| | | |
|---|---|---|
| 1,380,717 | Herman | June 7, 1921 |
| 2,281,628 | Snader | May 5, 1942 |